United States Patent
Bouzid et al.

(10) Patent No.: US 12,541,953 B2
(45) Date of Patent: Feb. 3, 2026

(54) NEAR-DUPLICATE DETECTION OF IMAGES FOR TRAINING OR VALIDATION OF MACHINE LEARNING MODELS

(71) Applicant: LandingAI Inc., Palo Alto, CA (US)

(72) Inventors: Abdelhamid Bouzid, Louisville, KY (US); Mark William Sabini, River Edge, NJ (US)

(73) Assignee: LandingAI Inc., Palo Alto, CA (US)

( * ) Notice: Subject to any disclaimer, the term of this patent is extended or adjusted under 35 U.S.C. 154(b) by 355 days.

(21) Appl. No.: 18/139,608

(22) Filed: Apr. 26, 2023

(65) Prior Publication Data

US 2024/0362895 A1 Oct. 31, 2024

(51) Int. Cl.
*G06K 9/00* (2022.01)
*G06V 10/75* (2022.01)
*G06V 10/774* (2022.01)

(52) U.S. Cl.
CPC .......... *G06V 10/774* (2022.01); *G06V 10/757* (2022.01)

(58) Field of Classification Search
CPC .. G06V 10/774; G06V 10/757; G06V 10/761; G06V 10/776; G06V 10/82; G06N 3/08; G06F 18/214; G06F 18/23213; G06F 18/23; G06F 18/217; G06F 18/22
See application file for complete search history.

(56) References Cited

U.S. PATENT DOCUMENTS

2023/0206131 A1* 6/2023 Brock ................ G06N 20/00
706/12

OTHER PUBLICATIONS

Narayana, V. A., Govardhan, A., & Premchand, P. (Nov. 2011). To create a confusion matrix in respect of threshold being fixed for effective detection of near duplicate web documents in web crawling. In 2011 6th International Conference on Computer Sciences and Convergence Information Technology (Year: 2011).*
Y. Bo, Y. Chen, W. He and J. Xiang, "DVD: Constructing a Discriminative Video Descriptor by Convolving Frame Features," 2018 IEEE Fourth International Conference on Multimedia Big Data (BigMM), Xi'an, China, 2018, pp. 1-5 (Year: 2018).*
Barz, B., & Denzler, J. (2020). Do we train on test data? purging cifar of near-duplicates. Journal of Imaging, 6(6), 41. (Year: 2020).*
Foo, J. J., Zobel, J., & Sinha, R. (Sep. 2007). Clustering near-duplicate images in large collections. In Proceedings of the international workshop on Workshop on multimedia information retrieval (pp. 21-30). (Year: 2007).*

(Continued)

*Primary Examiner* — Gregory A Morse
*Assistant Examiner* — Kevin M Coomber
(74) *Attorney, Agent, or Firm* — Fenwick & West LLP

(57) ABSTRACT

A system filters near-duplicate images to generate data for training or validation of a machine learning model. The system receives a set of images and generates feature vectors from the images. The system clusters the feature vectors. For each cluster of feature vectors, the system determines near-duplicate pairs of images. The system may generate a cost matrix representing a linear assignment problem and find near-duplicate pairs of images by solving the linear assignment problem. The system filters images from the set of images based on the near-duplicate pairs of images. The system uses the filtered set of images for training or validation of the machine learning model.

20 Claims, 13 Drawing Sheets

(56) References Cited

OTHER PUBLICATIONS

Thyagharajan, K. K., & Kalaiarasi, G. (2021). A review on near-duplicate detection of images using computer vision techniques. Archives of Computational Methods in Engineering, 28(3), 897-916. (Year: 2021).*

M. Chen, Y. Wang, X. Zou, S. Wang and G. Wu, "A duplicate image deduplication approach via Haar wavelet technology," 2012 IEEE 2nd International Conference on Cloud Computing and Intelligence Systems, Hangzhou, China, 2012, pp. 624-628 (Year: 2012).*

* cited by examiner

NEAR-DUPLICATE DETECTION OF IMAGES FOR TRAINING OR VALIDATION OF MACHINE LEARNING MODELS

FIELD OF ART

This disclosure relates in general to machine learning models, and in particular to near-duplicate detection of images for training or validation of machine learning (ML) models.

BACKGROUND

Artificial intelligence techniques such as machine learning models are often used for making predictions based on input such as images. These machine learning models are trained using training data, for example, labelled images. Often training data is obtained from sources that include similar images. As a result, highly correlated images may get added to the training data. Including highly correlated images in the training data used for training machine learning models may affect the performance of the machine learning model being trained. For example, including highly correlated images may cause the machine learning model to get biased towards certain type of images at the cost of the performance for the entire distribution of the training dataset. Alternatively, including highly correlated images may cause the machine learning model to overestimate predictions.

SUMMARY

A system determines near-duplicate pairs of images to generate data used for training or validation of machine learning models. The machine learning model is configured to receive an image as input and generate output that predicts information based on the image. The system receives a set of images for generating data for training the machine learning model or for validating the machine learning model. The system generates a feature vector for each image from the set of images. The system clusters the feature vectors to generate clusters of feature vectors. The system determines near-duplicate images within each cluster by performing the following steps. For each cluster of feature vectors, the system generates a cost matrix. The system finds near-duplicate pairs of feature vectors based on the cost matrix. The system maps feature vectors of a pair to images to obtain near-duplicate pairs of images. The system filters the set of images by removing at least some of the images identified in the near-duplicate pairs of images from the set of images. The system uses the images from the filtered set as training dataset for training the machine learning model or as data for validating the machine learning model.

According to an embodiment, the non-diagonal elements of the cost matrix represent a measure of distance between a pair of feature vectors and the diagonal elements of the cost matrix are set to a large value, for example, infinity.

According to an embodiment, the feature vectors represent global feature vectors of the images. The system may use a convolutional neural network to extract global features from an image. The system extracts outputs of an intermediate (i.e., hidden) layer of the neural network as the feature vector representing global features of the image.

According to an embodiment, the system finds near-duplicate pairs of feature vectors by solving a linear assignment problem based on the cost matrix. For example, the system may perform a Hungarian method to determine pairs of matching feature vectors representing near-duplicate pairs.

Embodiments include methods that perform the above steps, non-transitory computer-readable storage media that store instructions for performing the above methods, and computer systems that include processors and non-transitory computer-readable storage media storing instructions for performing the above methods.

The figures depict various embodiments for purposes of illustration only. One skilled in the art will readily recognize from the following discussion that alternative embodiments of the structures and methods illustrated herein may be employed without departing from the principles of the embodiments described herein.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

DETAILED DESCRIPTION

A system uses user feedback on artificial intelligence (AI) solutions, for example, machine learning models for improving the AI solution. The system can be operated in various modes that allow model execution as well as user inspection to evaluate a machine learning model in various environments, for example, development environment or production environment. The system receives user feedback, thereby allowing users to inspect, intervene, override, and supervise the deployed AI solution. The model evaluation may be used for determining whether to promote the machine learning model in a continuous delivery process, for example, to determine whether a machine learning model can be promoted from a development environment to a production environment. The system uses sampling strategies for selecting an optimal set of samples for presenting to users for inspection.

Figure 1:
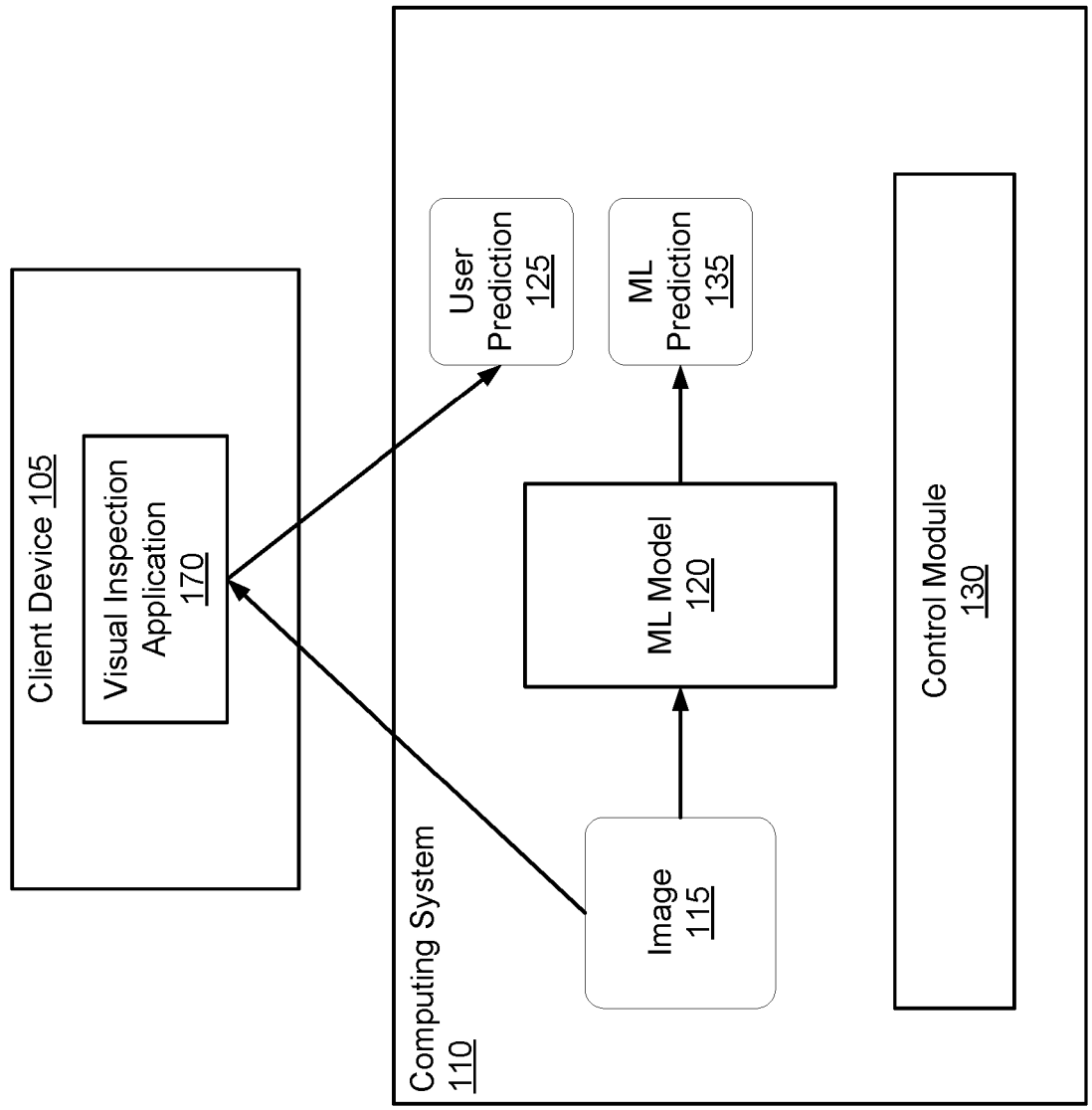
FIG. 1 is a block diagram of a system environment for configuring and using a machine learning based model for making predictions, according to one embodiment.

FIG. 1 is a block diagram of a system environment for configuring and using a machine learning based model for making predictions, according to one embodiment. The system environment 100 includes a computing system 110 and one or more client devices 105. The online system includes at least a ML model 120 and a control module 130.

The computing system 110 may represent multiple computing systems even though illustrated as one block in FIG. 1. Accordingly, the modules shown in FIG. 1 and FIG. 2 may execute in one or more computing systems. A computing system 110 may be part of a cloud platform, for example, AWS (AMAZON Web Services), GCP (GOOGLE Cloud Platform), or AZURE cloud platform. Accordingly, one or more modules may execute in the cloud platform. Furthermore, multiple instances of a module may execute, for example, the ML model 120 may execute in a development environment as well as a production environment.

The ML model 120 is trained to predict some results. The computing system 110 may be used for machine learning applications that make decisions based on predictions of the machine learning model. For example, the ML model 120 may be configured to receive an image 115 as input and trained to recognize certain object within the image or a feature of an object within the image. According to an embodiment, the system may capture an image of an object and the ML model may make predictions re certain feature of the object. The prediction made by the ML model is indicated as the ML prediction 135 in FIG. 1. For example, the system may capture images of a component in a manufacturing facility and the ML model is trained to predict whether the component is faulty. The manufacturing facility may use the predictions to make decisions regarding the component, for example, determine whether the component should be routed to a department for further inspection or the component may be routed for being delivered as a final product. The control module 130 generates control signals to perform these actions based on the predictions. For example, the control module 130 may either send a signal to be displayed via a user interface provided to an operator for taking appropriate action or the control module 130 may automatically operate equipment that routes the component as necessary based on the prediction.

According to an embodiment, the image 115 is provided to a visual inspection application 170 displayed via the display of a client device 105. The visual application 170 allows a user, for example, an expert or an operator to provide feedback regarding the feature of the image being monitored. The user feedback is indicated as the user prediction 125 in FIG. 1. According to an embodiment, the feature determined by a user via visual inspection application 170 is the same feature regarding which a prediction is being made by the ML model 120. The computing system 110 uses the user prediction 125 and the ML prediction in various ways depending in the mode in which the computing system 110 is configured to operate. These modes are further described herein in connection with FIGS. 3A-C.

Figure 2:
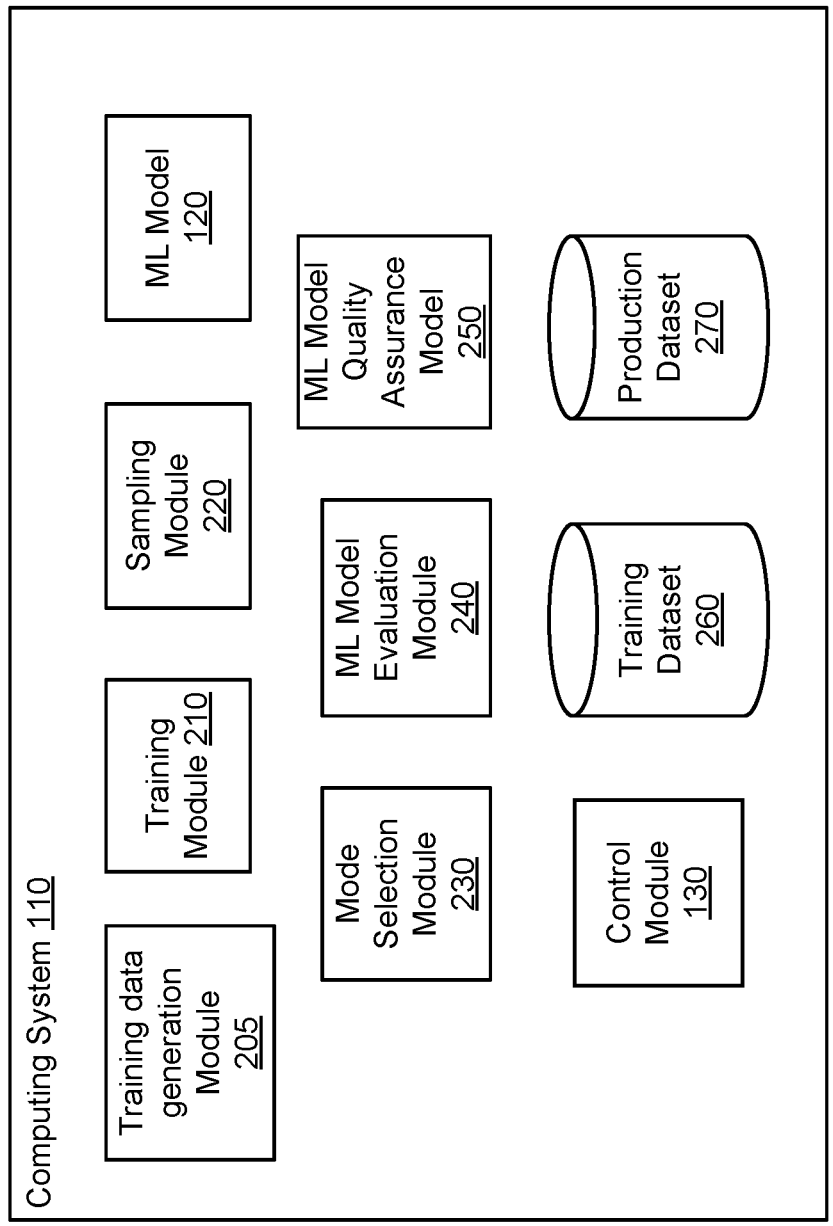
FIG. 2 illustrates the system architecture of an online system for configuring and using a machine learning based model, according to one embodiment.

FIG. 2 illustrates the system architecture of an online system for configuring and using a machine learning based model, according to one embodiment. The computing system 110 includes a training data generation module 205, a training module 210, a sampling module 220, the ML model 120, a mode selection module 230, an ML evaluation module 240, an ML quality assurance module 250, the control module 130, a training dataset 260, and a production dataset 270. Other embodiments may include more or fewer modules. Actions indicated as being performed by a particular module herein may be performed by other modules than those indicated. The ML model 120 and the control module 130 is described in connection with FIG. 1.

Figure 7:
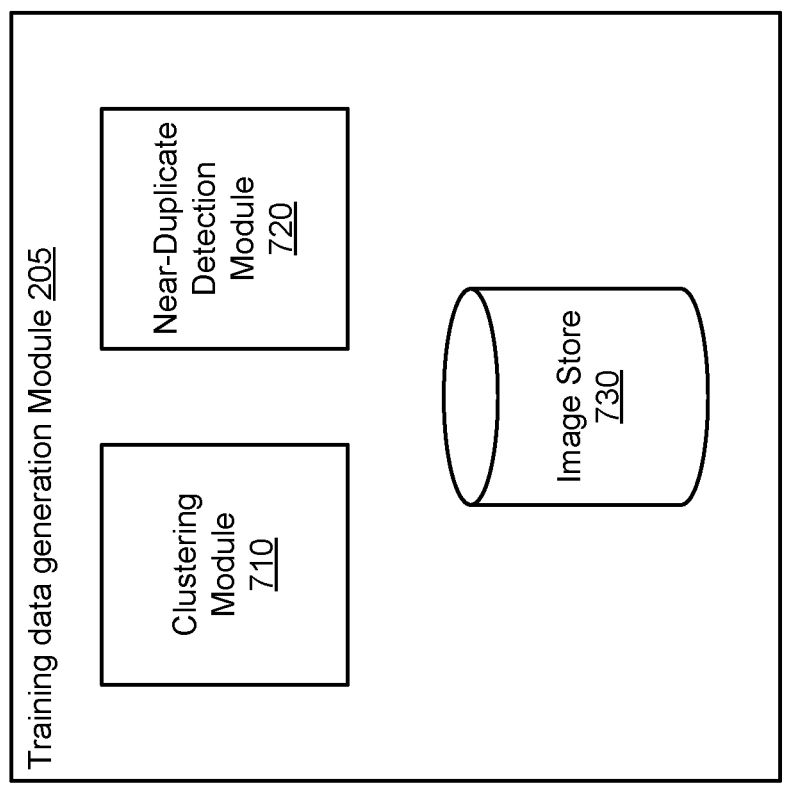
FIG. 7 shows the system architecture of the training data generation module according to an embodiment.
Figure 8:
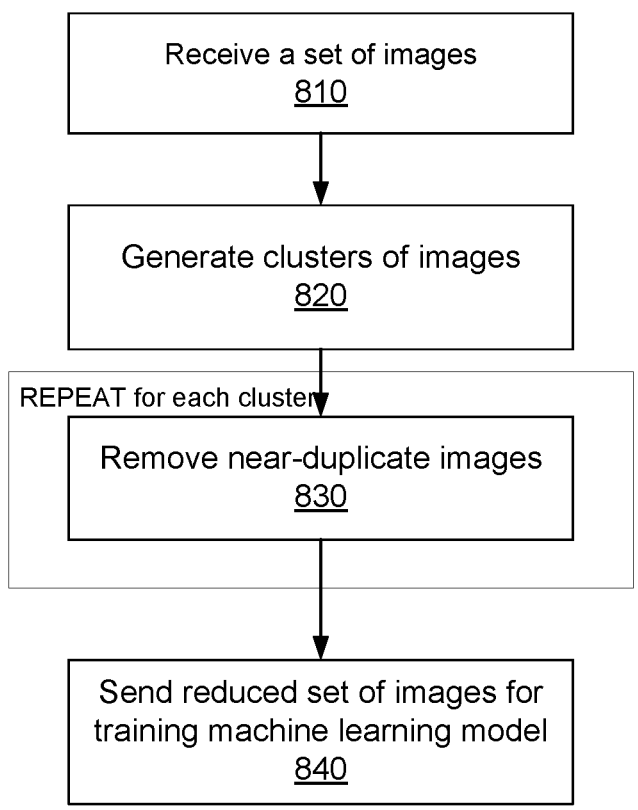
FIG. 8 is a flow chart illustrating the overall process for generating training data based on near-duplicate detection, according to an embodiment.
Figure 9:
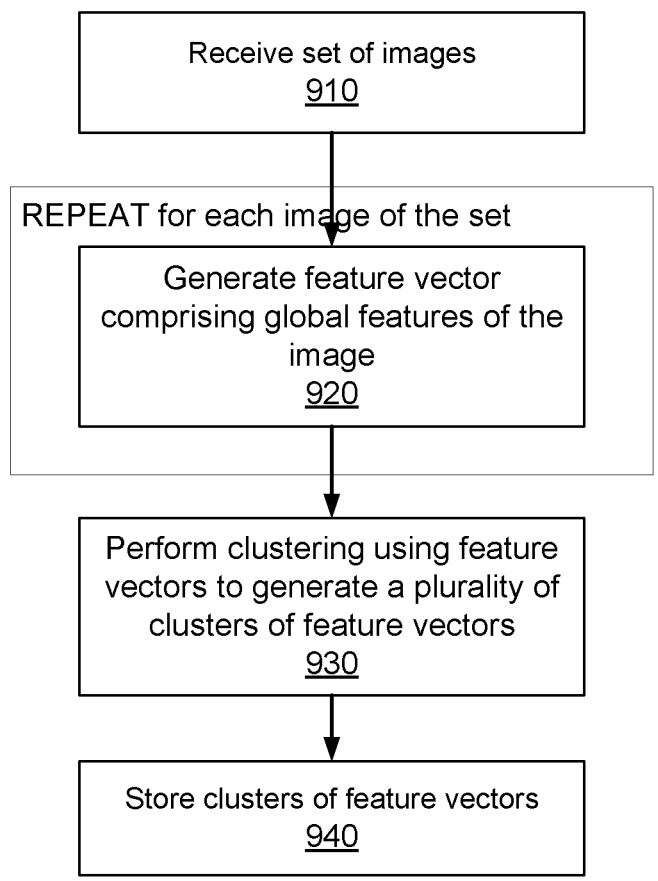
FIG. 9 is a flow chart illustrating the process for generating cluster of feature vectors of images, according to an embodiment.
Figure 10:
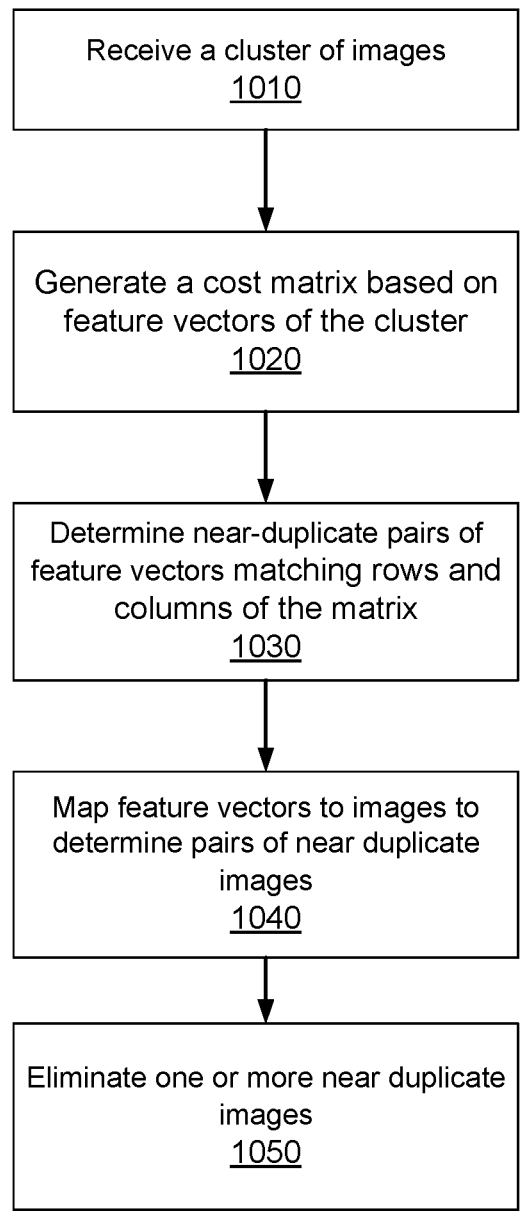
FIG. 10 is a flow chart illustrating the process for filtering images of a cluster based on near-duplicate detection, according to an embodiment.

The training data generation module 205 receives a set of images and filters some of the images to generate a training dataset based on the images or to add to an existing training dataset. The training data generation module 205 identifies near-duplicate images and removes some of the images to eliminate near-duplicate images in the training dataset. Eliminating near-duplicates improves the quality of training dataset and results in higher performance of the machine learning model that is trained. FIG. 7 provides further details of the system architecture of the training data generation module 205 that generates training data. FIGS. 8-10 show flowcharts illustrating processes performed by the training data generation module 205.

The training module 210 is used for training the ML model 120. The training dataset 260 is used for training the ML model 120. The training dataset may comprise labelled data where users, for example, experts view input data for the ML model and provide labels representing the expected output of the ML model for the input data. The training module 210 may initialize the parameters of the ML model using random values and use techniques such as gradient descent to modify the parameters, so as to minimize a loss function representing the difference between a predicted output and expected output for inputs of the training dataset.

In some embodiments, the training module 210 uses supervised machine learning to train the ML model 120. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The training module 210 can periodically re-train the ML model 120 using features based on updated training data.

The production dataset 270 stores data collected from a production environment. For example, an ML model 120 may be trained using training dataset 260 and deployed in a production environment. The values predicted by the ML model 120 in the production environment are stored in the production dataset. According to an embodiment, the data processed in the production environment is sampled by the sampling module 220. The samples selected by the sampling module 220 are presented to a user, for example, an operator. The data presented to the user includes the input processed by the ML model and the results as predicted by the ML model via the visual inspection application 170. The user can provide feedback regarding the prediction of the ML model. Accordingly, the user can indicate whether the prediction of the ML model 120 is accurate or poor. This feedback is used by the ML quality assurance module 250 for testing the quality of the ML model in production environment. Similar process may be used in a development or staging environment for evaluating the ML model by the ML evaluation module 240. According to an embodiment, the ML evaluation module 240 determines metrics such as precision, recall, and accuracy of the ML model 120 based on production data to evaluate the ML model.

Figure 3A:
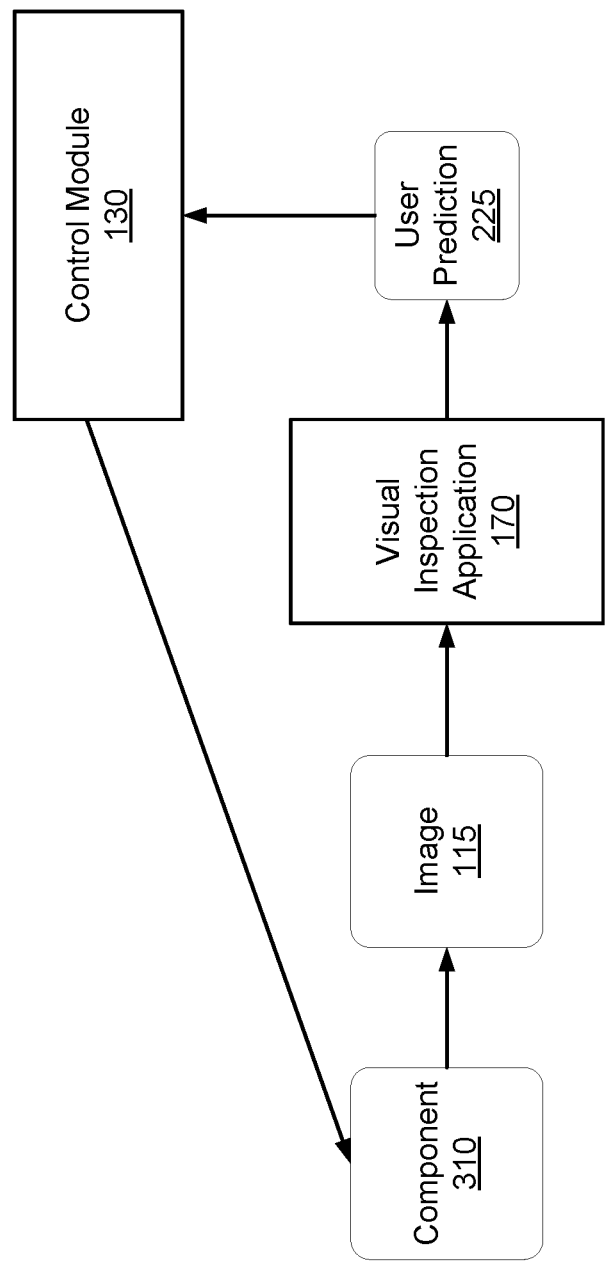
FIG. 3A illustrates a user mode for deploying an ML model according to an embodiment.
Figure 3B:
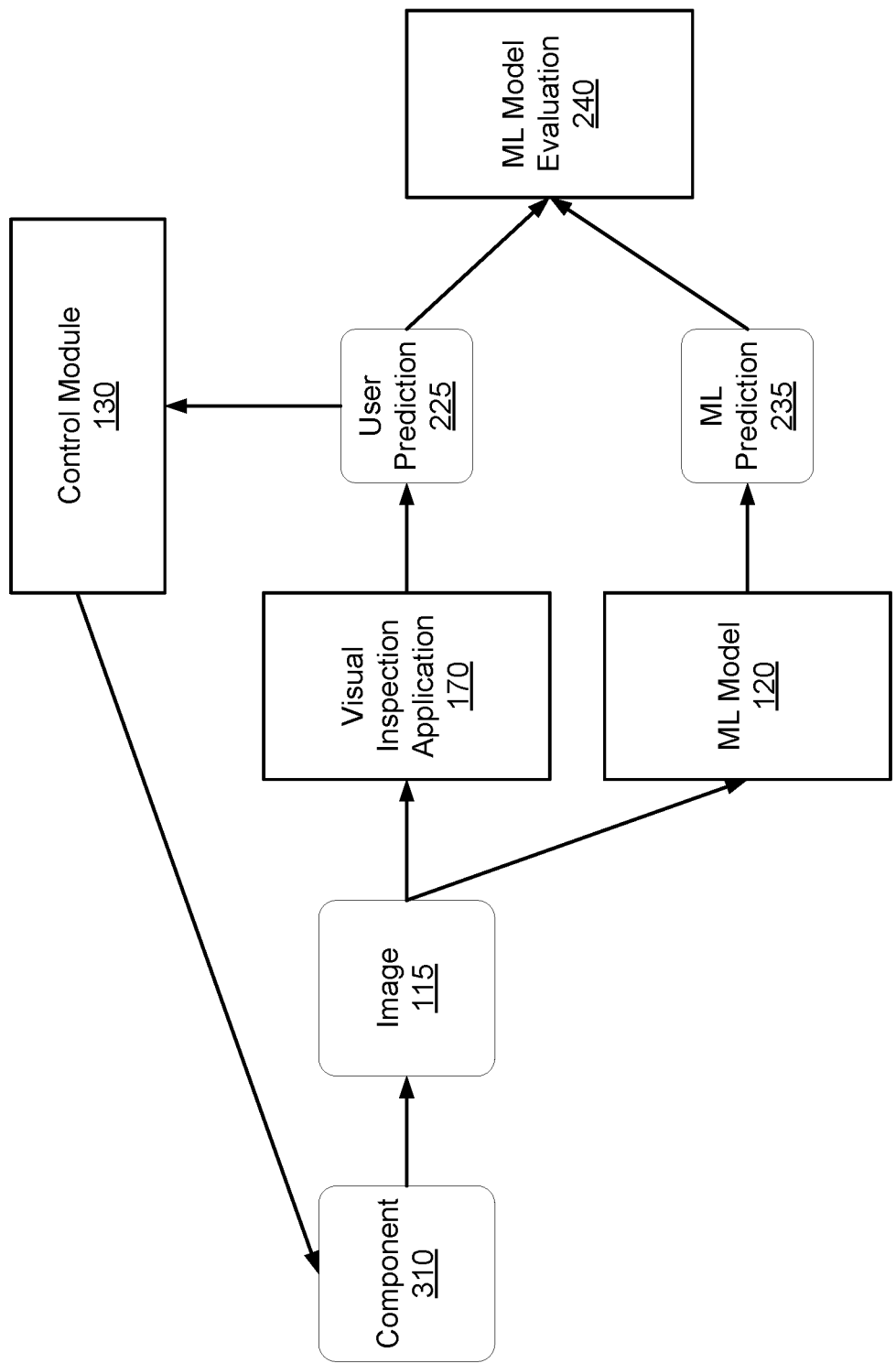
FIG. 3B illustrates a shadow mode for deploying an ML model according to an embodiment.
Figure 3C:
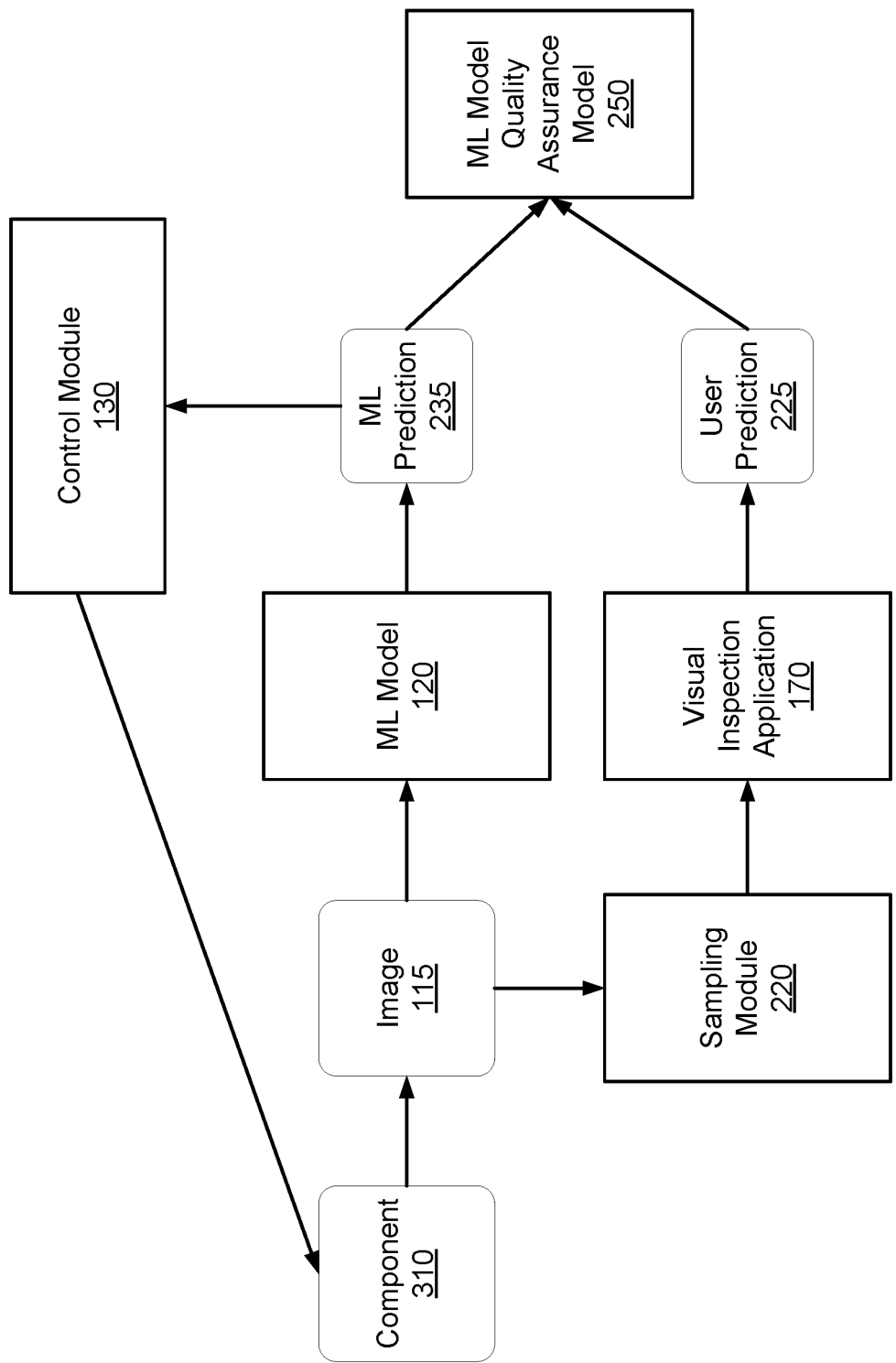
FIG. 3C illustrates a production mode for deploying an ML model according to an embodiment.

FIGS. 3A-C illustrate various modes in which the computing system 110 can operate for deploying an ML model. These modes may be used for example, in a manufacturing facility for controlling workflow related to some components 310. An image 115 of the component 310 is captured and is used to determine what action to take for the component based on either visual inspection or ML model or both.

FIG. 3A illustrates a user mode for deploying an ML model according to an embodiment. In the user mode, the prediction of the value of a feature of the component 310 is made by a user via visual inspection. The control module uses the user predictions to make determinations re the actions taken with respect to the component 310.

In this mode, the image 115 of the component 310 is sent by the computing system 110 to a visual inspection application 170 running on the client device 105. A user makes a determination regarding a specific feature of the component, for example, whether the component is defective. The determination by the user is referred to as the user prediction 225. The user prediction 225 is provided to the control module 130. The control module 130 generates the signals necessary to take the appropriate action associated with the component based on the user prediction 225. For example, a particular action A1 may be taken if the user prediction 225 indicates a particular value of the feature (e.g., feature indicating that the component is faulty), and a different action A2 may be taken if the user prediction 225 indicates a different value of the feature (e.g., feature indicating that the component is not faulty).

FIG. 3B illustrates a shadow mode for deploying an ML model according to an embodiment. In the shadow mode, the prediction of the value of the feature is made by a user via visual inspection. However, a prediction is also made by the ML model. The control module uses the user predictions to make determinations re the actions taken with respect to the component 310. The two predictions can be compared to evaluate the ML model and see how it is likely to perform in production without actually using the predictions of the ML model for making decisions re the components.

As shown in FIG. 3B, the image 115 of the component is provided as input to both the visual inspection application 170 and the ML model 120. The user views the visual inspection application 170 and make the user prediction 225 of the value of the feature of the component. The ML model 120 makes the ML prediction 235 of the value of the feature of the component. The user predictions are provided to the control module to control module 130 and the control module 130 generates the signals necessary to take the appropriate action associated with the component based on the user prediction 225. The ML prediction 235 is used to evaluate the ML model 120, for example, to measure the performance of the ML model when processing input data obtained in production. The evaluation may be performed by ML evaluation module 240. The system may store the ML predictions 235 obtained by execution of the ML model and the user prediction 225 in logs for processing at a later stage.

FIG. 3C illustrates a production mode for deploying an ML model according to an embodiment. In production mode, the image obtained from a component is processed both by the ML model 120 and by a user performing visual inspection. However, control module uses the ML predictions to make determinations re the actions taken with respect to the component 310.

As shown in FIG. 3C, the image 115 of the component is provided as input to both the visual inspection application 170 and the ML model 120. The ML model 120 makes the ML prediction 235 of the value of the feature of the component. The ML predictions 235 are provided to the control module to control module 130 and the control module 130 generates the signals necessary to take the appropriate action associated with the component based on the ML prediction 235. The user also views the visual inspection application 170 and make the user prediction 225 of the value of the feature of the component.

According to an embodiment, not all data values obtained in production are provided to the visual inspection application 170. The system may store the user predictions 225 provided by the user and also the ML predictions 235 obtained by execution of the ML model in logs for processing at a later stage. The user prediction 225 is used for quality assurance purposes. For example, the ML Model quality assurance module 250 may process the logs to determine how the ML model 120 performed in production environment. If the ML model 120 performs poorly in certain contexts, the information may be provided, for example, to developers or testers to further evaluate the ML model. For example, a determination by the ML quality assurance module 250 that the ML model performs poorly for certain type of inputs may be used for obtaining training data based on that particular type of inputs and using for retraining the ML model 120.

The system may operate in other modes not described in FIGS. 3A-C, for example, an experimental mode in which the ML model is used for processing all the inputs and the visual inspection application is not used. This mode may be used during development and testing of the ML model 120.

The different modes of the system illustrated herein are used in a CI/CD pipeline for deploying ML models, for example, in a cloud platform. For example, an experimental mode may be used for building the ML model in a development environment. While the ML model is being developed, the production environment is handled using the user mode. When the ML model passes the criteria for being promoted to the next stage, for example, staging environment, the shadow mode may be used for evaluating the ML model 120. When the ML model 120 is evaluated to determine that the ML model satisfies the required quality metrics for being promoted to a production stage, the system operates in the production mode.

According to an embodiment, the computing system 110 reconfigures the user interface of the visual inspection application 170 based on the mode of the system which in turn is determined based on the type of environment that the system is operating in. The automatic reconfiguration of the visual inspection application allows the system to automate a continuous integration/continuous deployment pipeline being executed for deployment of the ML models, for example, in cloud platforms.

Figure 4A:
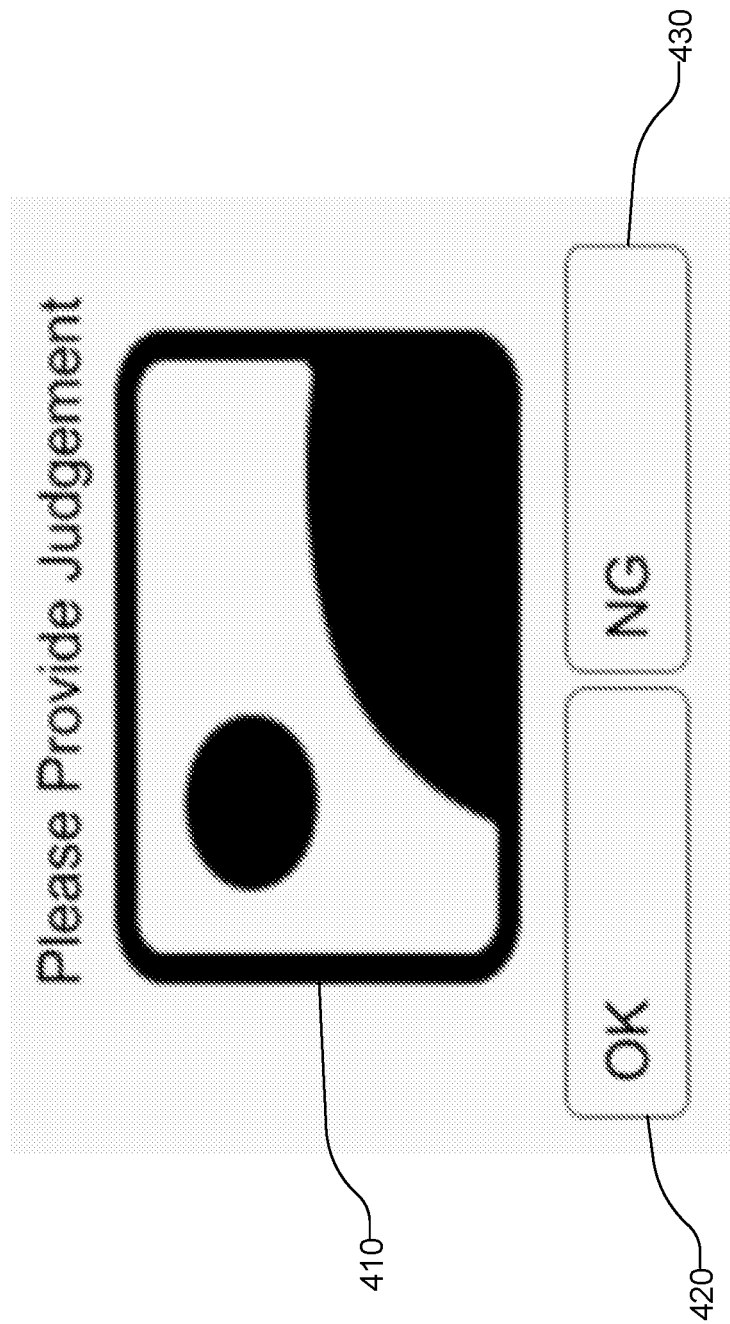
FIG. 4A shows the screen shot of the user interface of the visual inspection application in shadow mode, according to an embodiment.
Figure 4B:
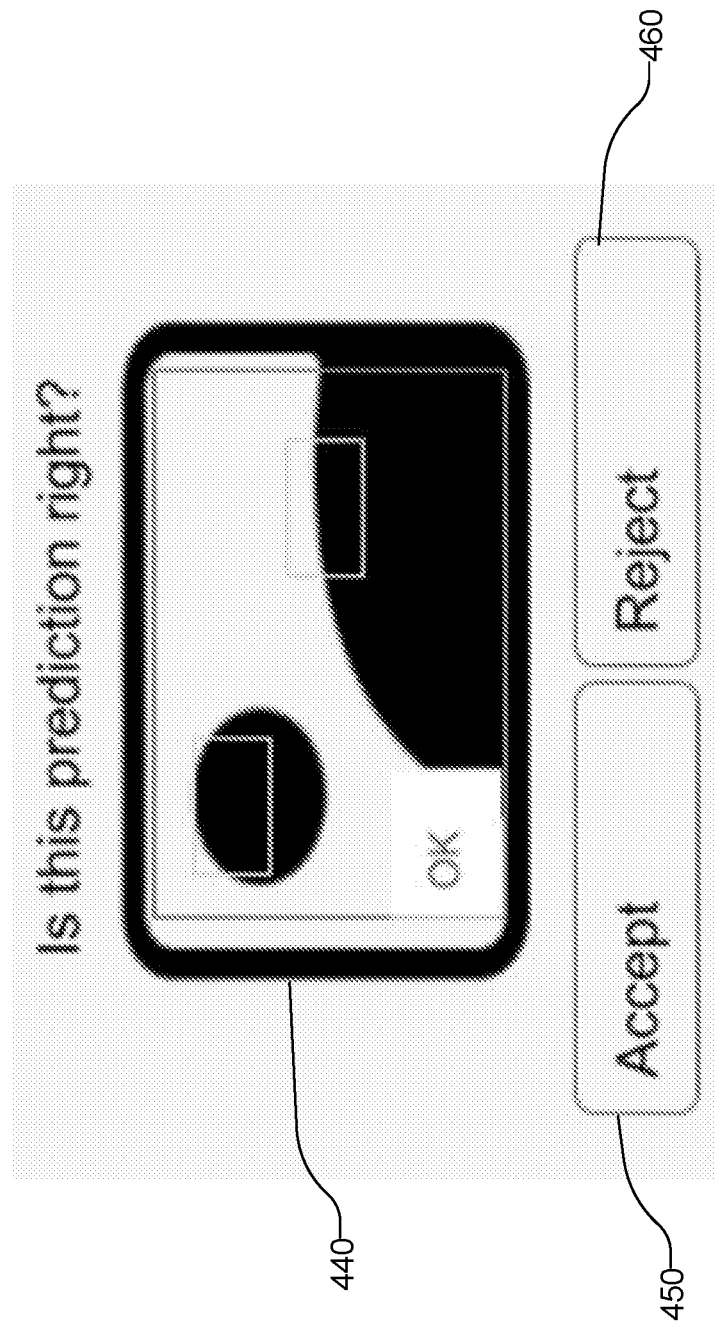
FIG. 4B shows the screen shot of the user interface of the visual inspection application in production mode, according to an embodiment.

FIGS. 4A-B show screen shots of the user interface used for performing visual inspection according to an embodiment. FIG. 4A shows the screen shot of the user interface of the visual inspection application in shadow mode, according to an embodiment. The user interface presents an image 410 being processed to the user, for example, an image of a component in a manufacturing facility. The user is provided with buttons or any other widget for providing input for example, drop down lists, text boxes, and so on. For example, button 420 allows user to indicate that the component displayed in the image 410 is good (i.e., OK) and button 430 allows the user to indicate that the component displayed in the image is not good (i.e., NG).

FIG. 4B shows the screen shot of the user interface of the visual inspection application in production mode, according to an embodiment. The image 440 presented to the user includes the result of the processing performed by the ML model 120. Widgets 450, 460 are provided to the user to provide inputs indicating whether the user accepts or rejects the prediction of the ML model respectively.

Sampling of Data for Model Evaluation

In a production environment, an ML model 120 may be invoked from hundreds to tens-of-thousands of times a day. Embodiments present the input processed by the ML model, for example, an image to users to receive user feedback for evaluating the model execution in production or another environment. Since an ML model may be invoked a very large number of times in a production environment, it is infeasible for a user to review every single prediction of the ML model.

The sampling module 220 samples a subset of the production data for review by users as shown in FIG. 3C. There are several sampling strategies that may be used for example, time-based, threshold-based, and class-based sampling. Several sampling strategies generate samples that do not cover the entire population distribution. These strategies typically generate a poor sample since they may use samples that are similar to the training dataset and as a result do not address the problem that the model may not perform well if the production data is different from the training data. Furthermore, these samples may all have similar features and leave out large portions of feature values that may be available in the production data. To achieve good coverage of the data using these strategies, a large number of samples may have to be selected.

In contrast, the system according to various embodiments, maximizes variety in the content of the input data. As a result, a small set of samples extracted from the production data is able to provide adequate coverage.

Figure 5:
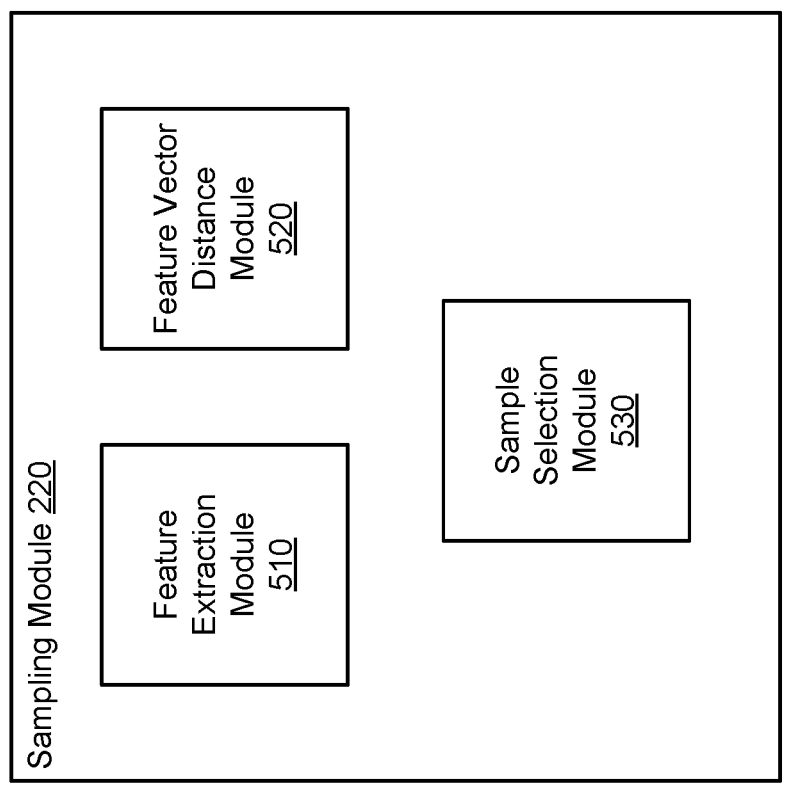
FIG. 5 shows the system architecture of the sampling module according to an embodiment.

FIG. 5 shows the system architecture of the sampling module 220 according to an embodiment. The sampling module 220 includes a feature extraction module 510, a feature vector distance module 520, and a sample selection module 530. Other embodiments may have more or fewer modules than those indicated in FIG. 5.

The feature extraction module 510 extracts features of the elements of the data processed by the ML model 120. According to an embodiment, the data processed by the ML model comprises images, for example, images of components in a manufacturing facility or images of objects that are being monitored by a system performing computer vision. The ML model may be a model configured to process images, for example, a convolutional neural network. The feature extraction module 510 may extract either global (i.e., image-level) features that process the entire image or local (e.g., patch-level) features that process portions of images. Global features capture large-scale attributes of the image (e.g., lighting changes). Local features capture smaller, localized features like defects in an object observed in a portion of the image.

According to an embodiment, the system uses a convolutional neural network to extract global features from an image. The system extracts outputs of an intermediate (or hidden) layer of the neural network. The system may apply global max pooling across the height/width dimensions, to generate a single vector. The resulting vector summarizes the global content of the image and represents large-scale changes such as lighting changes.

In some embodiments the system extracts local features that are more useful in certain domains, for example, manufacturing facilities. The system obtains the entire feature volume (for example, a vector in three-dimensional space H×W×C), and processes it as a collection of H×W vectors, each of dimensionality C. In this representation, each vector corresponds spatially to a patch in the original input image. The system considers the feature representation of the image as the collection of these H×W vectors. In this way, the system preserves local information within the image. This however increases size of each feature representation.

The feature vector distance module 520 determines a measure of distance between two samples representing data processed by the ML model. According to an embodiment, the system generates feature vector representations of each sample and determines a measure of distance between two feature vectors, for example, based on an L1 norm or L2 norm.

Figure 6:
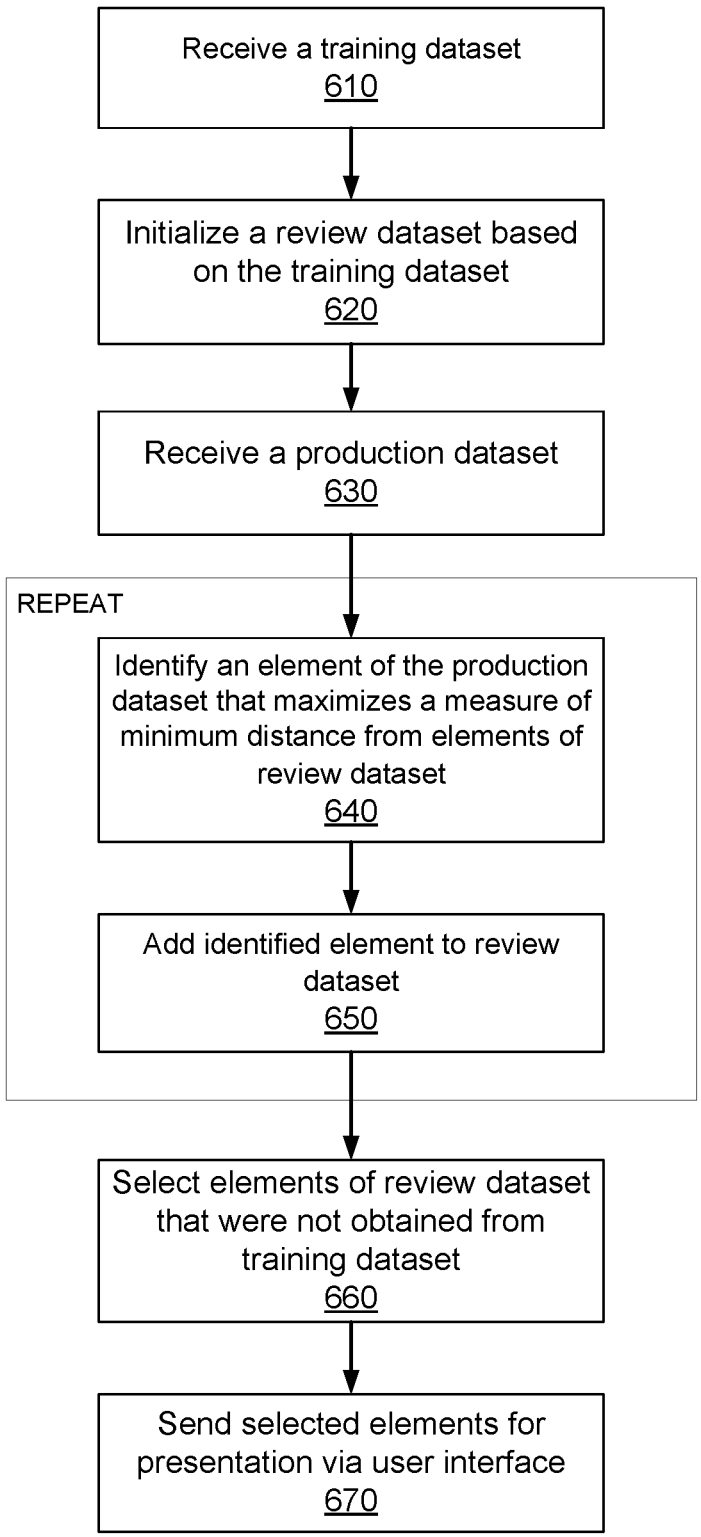
FIG. 6 is a flow chart illustrating the overall process for sampling data for presenting to users, according to an embodiment.

The sample selection module 530 selects samples from production data based on techniques disclosed herein, for example, based on the process disclosed in FIG. 6. The sample selection module 530 selects samples representing a subset of the data that is a good representation of the production distribution. The sample selection module 530 determines an ordering of the sampled subset of production data. The system uses the order in which the samples are provided as an indication of priority of each sample. Accordingly, the system provides the samples to users in the order of priority so as to achieve the best utilization of the available resources.

FIG. 6 is a flow chart illustrating the overall process 600 for sampling data for presenting to users, according to an embodiment. The steps of the process may be executed in an order different from that indicated herein. The steps are indicated as executed by a system, for example, the computing system 110 and may be executed by modules indicated in FIG. 1, 2, or 5.

The system receives 610 a machine learning model trained using a training dataset $D_T$. The system initializes 620 a review dataset $D_R$ based on elements of the training dataset. The review dataset may also be referred to as a core set. For example, the system may initialize the dataset $D_R$ to the training dataset $D_T$. The system receives 630 a production dataset $D_P$ generated using values received from a production environment. For example, the system may extract inputs processed by the ML model executing in a production environment and use them as the production dataset $D_P$.

The system samples a subset of elements of the production dataset by repeatedly executing the steps 640 and 650. The system identifies 640 an element of the production dataset $D_P$ that maximizes a measure of minimum distance of the element from elements of the review dataset $D_R$. The system adds 650 the identified element to the review dataset $D_R$.

The system selects 660 one or more elements of the review dataset that were not obtained from the training dataset. For example, the system may remove all elements of the training dataset $D_T$ from the review dataset $D_R$. The system sends 670 elements selected from the review dataset for presentation via the user interface of the visual inspection application 170. The visual inspection application 170 presents a result of execution of the machine learning model for an element of the review dataset and receives user feedback indicating accuracy of the result of execution of the machine learning model. The user feedback may be logged and in addition or in the alternative may be further processed to evaluate the ML model. For example, if the user feedback indicates that the ML model has a measure of quality below a threshold value, the system may send a request to re-train the ML model. According to an embodiment, the system may analyze the user feedback to identify types if features of the production dataset that indicate lower accuracy of the ML model so that training dataset having these types of features is added to the training dataset while retraining the ML model.

The elements selected from the review dataset are prioritized for presentation via the user interface. The priority of a sample is determined based on an order in which the sample was added to the review dataset. Accordingly, an element E1 added to the review dataset before an element E2 has higher priority for presenting via the user interface compared to the element E2. The system may select a subset of elements of the review dataset based on the priority. The system may also make a selection of the users processing the elements based on the priority, for example, a more experienced user may be given elements with higher priority compared to a user with less experience.

A process similar to that shown in FIG. 6 may be used at training time or at production time. At training time, the system may initialize the review dataset to empty, i.e., a set with no elements. The process of FIG. 6 is optionally executed to generate a summarized training dataset that represents a subset of the training dataset with statistical properties that are similar to the original training dataset. The summarized training dataset is used for training the model, or substituted for the full training dataset in downstream tasks to improve computational efficiency.

At inference time (for example, in a production environment where the machine learning model is used), the system initializes the review dataset to a training dataset used for training the model. The elements of the training dataset are removed from the review dataset when sending elements for review.

If the training dataset is large, executing the process of FIG. 6 at inference time may be computationally expensive. As an optimization, in some embodiments, the summarized training dataset is substituted for the entire training dataset at inference time to improve computational efficiency of execution.

Following is a pseudocode illustrating the process of FIG. 6 according to an embodiment. The following process receives as input a set of feature vectors z, and selects K feature vectors that best cover the space spanned by z. The system also receives as input a set of feature vectors z_preexisting that is initialized to empty for generating a summarized training dataset, which can be substituted for the full training dataset in downstream tasks to reduce computational expense. Alternatively, z_preexisting is initialized to the training dataset or summarized training dataset for generating a review dataset (reviewdataset) that excludes elements of the received z_preexisting set for providing to users for review via visual inspection.

```
if z_preexisting is empty:
    # If no preexisting vectors, then all are equally good.
    # Just choose one at random to start.
    let v_chosen = select one vector randomly from z
    for each vector v in z:
        let min_dist[v] = distance between v and v_chosen
    add v_chosen to reviewdataset
else:
    for each vector v in z:
        let min_dist[v] = +infinity
```

-continued

```
    for each vector v_p in z_preexisting:
        for each vector v in z:
            let dist[v] = distance between v and v_p
            update min_dist[v] = min(min_dist[v], dist[v])
        select v_chosen maximizing min_dist[v_chosen]
        add v_chosen to reviewdataset
repeat K – 1 times:
    for each vector v in z:
        let dist[v] = distance between v and v_chosen
        update min_dist[v] = min(min_dist[v], dist[v])
    select v_chosen maximizing min_dist[v_chosen]
    add v_chosen to reviewdataset
return reviewdataset
```

In the above process, the system repeatedly selects an unchosen feature vector that is furthest away from current reviewdataset, i.e., v_chosen is a feature vector that maximizes the value of min_dist (minimum distance) from elements of the reviewdataset. The system adds the v_chosen feature vector to the reviewdataset and updates the min_dist (minimum distance) values of vectors of z and review dataset.

The sampling strategy as disclosed by the above processes selects elements (e.g., images) that cover the production data well and lie outside the training set. This prevents the system from selecting elements that are similar to the training dataset. The process also builds up the review dataset in priority order that can be used to prioritize the review process. Accordingly, the first element sampled has the highest priority for review and the last element sampled has the lowest priority for review.

The ability to prioritize elements for review allows the system to select a subset of elements that are review, thereby resulting in improvement of efficiency of execution and efficiency of resource utilization. For example, improvement in efficiency of use of computational resources since fewer samples are processed, improvement in efficiency of use of storage resources since fewer samples need to be stored as well as improvement in efficiency of use of network since fewer samples are transmitted the user for review. Furthermore, the techniques disclosed improve user efficiency since fewer user resources are consumed while maximizing coverage for a given amount of resources.

Near-Duplicate Detection Based Training Data Generation

The training of the ML model 120 is performed using training dataset comprising images for ML models 120 that process images. The image being added to the training dataset may be obtained from a production system after inspection by a human in the loop. The image may be added to the training dataset or to a validation set to further monitor the performance of the ML model 120. The system performs near-duplicate detection to avoid adding samples that are same as an existing sample or very similar (i.e., highly correlated).

Note that filtering out near-duplicate images from a set is more challenging than filtering out exact matching images, i.e., images with matching pixel content. For example, exact matching images may be identified by determining a hash value based on the pixel content of images and comparing the hash value. However, hash-based comparison fails if the images are not identical, even if the images are very similar. Embodiments detect such near duplicate images and filter them from a set of images so that the filtered set of images can be used for training or validation of the ML model 120. Near-duplicate images may be images of the same object but acquired under different conditions, such as lighting, view angle, focal distance, etc. Near-duplicate images may be images that are artificially augmented from the same source image, for example, via data augmentation.

The system according to various embodiments, allows filtering of near duplicate images, thereby improving the quality of the ML model 120 being trained or validated. Furthermore, filtering of images as disclosed herein reduces the training/validation dataset size, thereby improving the computational efficiency of the process of training or validating the ML model 120, while improving the performance of the ML model 120.

Filtering of near-duplicate images may be performed as a manual process that can be highly cumbersome and time consuming. A system may use computer vision metrics, for example, L2 distance, structural similarity, and so on but such techniques would fail to detect near duplicates in several scenarios and only work in a limited capacity. In contrast, the system as disclosed uses deep-learning based approach for near-duplicate detection that is well-suited for the computer vision and other domains.

Although the techniques disclosed herein are described using images as input to the ML model 120 the techniques disclosed work for other types of data as input, for example, natural language input, audio input, sequences of sensor data, and so on. Accordingly, the system can perform near-duplicate detection for a sample representing any type of data to determine whether the sample should be included in the training dataset.

FIG. 7 shows the system architecture of the training data generation module according to an embodiment. The training data generation module 205 includes a clustering module 710, a near-duplicate detection module, and an image store 730. Other embodiments may include more or fewer modules than indicated in FIG. 7. Actions performed as indicated by a particular module may be performed by other modules than those indicated herein.

The image store 730 stores images that are used for training or validation of ML model 120. The images may be provided by users as training data. The images may be obtained from a production system, for example, the systems shown in FIGS. 3A-C. The images stored in image store 730 may include near-duplicate images.

The training data generation module 205 eliminates near-duplicate images representing highly correlated images from the image store 730 before sending them to training or validation of ML model 120. This is so because including highly correlated images within the same split can bias the ML model 120 towards performing well on that particular type of images, at the expense of doing well on the entire distribution of images. Furthermore, highly correlated images within different splits (e.g., training and test) cause the model performance to be overestimated, since the test images are not all distinct, and the model can perform deceptively well on near-duplicate samples during training but not perform well when other images are processed.

The detection of near-duplicate images is performed in two stages: (1) a grouping stage that generates groups (or clusters) of images and (2) a fine-grained pairing stage that detects near-duplicate images within a cluster.

The clustering module 710 executes the grouping stage by generating clusters of images. According to an embodiment, the clustering module 710 generates clusters of images by executing the process illustrated in FIG. 9. Clustering of images improves the execution of the process of detecting near-duplicate pairs of images. This is so because the time complexity of execution of the near-duplicate detection of images is a polynomial in the number of images that are processed. Grouping the images into smaller groups (or clusters) reduces the time taken for detecting near-duplicate pairs of images by processing smaller batches of images.

The near-duplicate detection module 720 executes the fine-grained pairing stage by identifying near-duplicate pairs of images. According to an embodiment, the near-duplicate detection module 720 identifying near-duplicate pairs of images by executing the process illustrated in FIG. 9. The training data generation module 205 eliminates at least some of the images based on the near-duplicate pairs or images. For example, the training data generation module 205 may remove one of the images from each near-duplicate pairs or images.

FIG. 8 is a flow chart illustrating the overall process for generating training data based on near-duplicate detection, according to an embodiment. The steps indicated in the flowchart may be performed in an order different from that indicated herein.

The training data generation module 205 receives 810 a set of images for use in training/validation of ML model 120. The images are stored in image store 730. The images may be obtained from a production system or from external sources.

The clustering module 710 generated 820 clusters of the images received. The details of the step 820 of generating clusters are shown in FIG. 9 and described in connection with FIG. 9. The step 820 roughly groups the images into groups that contain similar images. This improves the efficiency of execution of the near-duplicate detection since given a large number of images, the time complexity of comparing each pair of images is $O(N^2)$ which is a highly computationally-intensive process.

The near-duplicate detection module 720 processes images of each cluster generated by the clustering module 710 and removes 830 images determined to be near-duplicate of other images. The details of the step 830 are shown in FIG. 10 and described in connection with FIG. 10. The set of images is reduced in size as a result of removing images. The training data generation module 205 sends 840 the reduced set of images for training or validation of ML model 120.

FIG. 9 is a flow chart illustrating the process for generating cluster of feature vectors of images, according to an embodiment. The steps indicated in the flowchart may be performed in an order different from that indicated herein. The process illustrated in FIG. 9 receives a set of images as input and generates a cluster of images using a feature vector representation of each image.

The clustering module 710 receives 910 a set of images for clustering. The clustering module 710 repeats the step 920 for each image of the set received. Accordingly, the clustering module 710 generates 920 a feature vector based on the image. According to an embodiment, the feature vector is based on global features of the image. The reason a global feature vector is used is that near-duplicates of images typically have a highly similar global content. Using local features for clustering may categorize near-duplicate images in different clusters. The global features of the image may be generated by providing the image to a neural network, for example, a convolution neural network. The neural network comprises multiple layers of nodes including one or more hidden layers. An embedding is extracted from the neural network. The embedding represents the output of a hidden layer of neural network. The clustering module 710 performs 930 clustering using the feature vectors to generate a plurality of clusters of the feature vectors. The clustering module 710 stores mappings from feature vectors to images so that the images corresponding to any feature vector can be determined. The clustering module 710 stores the clusters of features vectors for processing by the near-duplicate detection module 720, for example, as shown in FIG. 10.

According to an embodiment, the clustering module 710 performs clustering using density-based clustering, for example, density-based spatial clustering of applications with noise (DBSCAN). The density-based clustering specifies a parameter epsilon representing a permitted variation (distance) within a cluster. According to an embodiment, distance metric used for clustering is cosine distance. However other embodiments can use other distance metrics, for example, L2 norm. Although the embodiments disclosed use density-based clustering, the processes described herein can use other types of clustering techniques such as k-means clustering.

FIG. 10 is a flow chart illustrating the process 1000 for filtering images of a cluster based on near-duplicate detection, according to an embodiment. Given a group of feature vectors within a single cluster, the process illustrated in FIG. 10 finds near-duplicate pairs of images within the cluster. Images within a single cluster may be similar but may not qualify as near-duplicates. Near-duplicate images have a similarity measure that is above a threshold value. Several pairs of images with similarity measure below such a threshold that are not near-duplicate may exist in a cluster. The steps indicated in the flowchart may be performed in an order different from that indicated herein. The process illustrated in FIG. 10 is repeated for each cluster generated by the process of FIG. 9.

The near-duplicate detection module 720 receives 1010 a cluster of images for determining near-duplicates within the cluster. According to an embodiment, the near-duplicate detection module 720 frames a linear assignment problem based on the images of the cluster and solves the linear assignment problem to generate near-duplicate pairs of images.

The near-duplicate detection module 720 generates 1020 a cost matrix based on feature vectors of images of the cluster. The cost matrix may be represented as A where a non-diagonal element A[i, j] of the matrix A has a value based on a distance between the feature vectors corresponding to images i and j in the cluster. Accordingly, for non-diagonal element A[i, j]=distance ($F_i$, $F_j$), where distance represents a cosine distance between two feature vectors, and $F_i$, $F_j$ represent feature vectors of images i and j respectively. For each diagonal element, i.e., A[i,i], the cost matrix stores a large value, for example, a value representing infinity so that the system avoids pair an image with itself.

The near-duplicate detection module 720 performs matching pairs of feature vectors between rows and columns of the matrix to determine 1030 near-duplicate pairs of images within the cluster.

According to an embodiment, the near-duplicate detection module 720 executes the Hungarian algorithm (or process) to match rows and columns of the matrix to generate pair of images. The generated pairs represent near-duplicate pairs. According to an embodiment, the steps of the Hungarian method are as follows.

The system subtracts the smallest entry in each row from all the other entries in the row. This makes the smallest entry in the row equal to 0. The system subtracts the smallest entry in each column from all the other entries in the column. This makes the smallest entry in the column equal to 0. The system pairs rows and columns by matching rows and columns that have the 0 entries such that the fewest lines possible are drawn.

According to an embodiment, the system processes a bipartite graph representation of the cost matrix. A bipartite graph corresponds to the cost matrix, where the weights of edges correspond to the entries of the matrix. The system executes the Hungarian algorithm by manipulating the weights of the bipartite graph to find a stable, maximum (or minimum) weight matching. The system performs the matching by finding a feasible labeling of a graph that is perfectly matched, where a perfect matching is denoted as every vertex having exactly one edge of the matching. Although embodiments perform pairing the images based on the Hungarian algorithm, however other techniques may be used for pairing near duplicate images within a cluster. The step 1030 generates a list of pairs ($v_1$, $v_2$) of near duplicate feature vectors $v_1$ and $v_2$ corresponding to images of the set of images of the cluster.

The system maps the feature vectors of the generated pairs of feature vectors to determine the corresponding images and generate pairs of near duplicate images ($i_1$, $i_2$) where $i_1$ and $i_2$ represent images corresponding to the feature vectors $v_1$ and $v_2$ respectively of a pair. The system eliminates at least some of the images based on the near-duplicate pairs of images determined. For example, the system may remove one of the images from each near-duplicate pair of images or at least a subset of near-duplicate pairs of images.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code or instructions embodied on a non-transitory computer readable storage medium or machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A computer-implemented method for generating training data for a machine learning model, the method comprising:
   receiving a set of images for generating training dataset for training the machine learning model, the machine learning model configured to receive an input image and output a prediction for the input image;
   for each image from the set of images, generating a feature vector;
   clustering the feature vectors to generate a plurality of clusters of feature vectors;
   for each cluster of feature vectors:
      generating a cost matrix, wherein a non-diagonal element of the cost matrix represents a measure of distance between a pair of feature vectors;
      finding near-duplicate pairs of feature vectors based on the cost matrix; and
      obtaining near-duplicate pairs of images based on the near-duplicate pairs of feature vectors;
   filtering the set of images by removing one or more images from the set of images, wherein the removed images belong to the near-duplicate pairs of images; and
   adding images from the filtered set of images to a training dataset for training the machine learning model.

2. The computer-implemented method of claim 1, further comprising:
   training the machine learning model using the training dataset, the training comprising updating parameters of the machine learning model.

3. The computer-implemented method of claim 1, further comprising:
   using images from the filtered set of images for validating the machine learning model.

4. The computer-implemented method of claim 1, wherein finding near-duplicate pairs of feature vectors based on the cost matrix comprises solving a linear assignment problem based on the cost matrix.

5. The computer-implemented method of claim 4, wherein solving the linear assignment problem based on the cost matrix is performed using a Hungarian matching process.

6. The computer-implemented method of claim 1, wherein generating the feature vector comprises providing the image as input to a neural network and extracting an embedding from a hidden layer of the neural network as the feature vector of the image.

7. The computer-implemented method of claim 1, wherein clustering the feature vectors to generate the plurality of clusters of feature vectors is performed using a density based clustering of the set of images.

8. The computer-implemented method of claim 1, wherein diagonal elements of the cost matrix are set to a value representing infinity.

9. A non-transitory computer readable storage medium storing instructions that when executed by one or more computer processors, cause the one or more computer processors to perform steps comprising:
   receiving a set of images for generating training dataset for training a machine learning model, the machine learning model configured to receive an input image and output a prediction for the input image;
   for each image from the set of images, generating a feature vector;
   clustering the feature vectors to generate a plurality of clusters of feature vectors;
   for each cluster of feature vectors:
      generating a cost matrix, wherein a non-diagonal element of the cost matrix represents a measure of distance between a pair of feature vectors;
      finding near-duplicate pairs of feature vectors based on the cost matrix; and
      obtaining near-duplicate pairs of images based on the near-duplicate pairs of feature vectors;
   filtering the set of images by removing one or more images from the set of images, wherein the removed images belong to the near-duplicate pairs of images; and
   adding images from the filtered set of images to a training dataset for training the machine learning model.

10. The non-transitory computer readable storage medium of claim 9, wherein the instructions further cause the one or more computer processors to perform steps comprising:
   training the machine learning model using the training dataset, the training comprising updating parameters of the machine learning model.

11. The non-transitory computer readable storage medium of claim 9, wherein the instructions further cause the one or more computer processors to perform steps comprising:
   using images from the filtered set of images for validating the machine learning model.

12. The non-transitory computer readable storage medium of claim 9, wherein finding near-duplicate pairs of feature vectors based on the cost matrix comprises solving a linear assignment problem based on the cost matrix.

13. The non-transitory computer readable storage medium of claim 12, wherein solving the linear assignment problem based on the cost matrix is performed using a Hungarian matching process.

14. The non-transitory computer readable storage medium of claim 9, wherein generating the feature vector comprises providing the image as input to a neural network and extracting an embedding from a hidden layer of the neural network as the feature vector of the image.

15. The non-transitory computer readable storage medium of claim 9, wherein clustering the feature vectors to generate the plurality of clusters of feature vectors is performed using a density based clustering of the set of images.

16. A computer system comprising:
one or more computer processors; and
a non-transitory computer readable storage medium storing instructions that when executed by the one or more computer processors, cause the one or more computer processors to perform steps comprising:
receiving a set of images for generating training dataset for training a machine learning model, the machine learning model configured to receive an input image and output a prediction for the input image;
for each image from the set of images, generating a feature vector;
clustering the feature vectors to generate a plurality of clusters of feature vectors;
for each cluster of feature vectors:
generating a cost matrix, wherein a non-diagonal element of the cost matrix represents a measure of distance between a pair of feature vectors;
finding near-duplicate pairs of feature vectors based on the cost matrix; and
obtaining near-duplicate pairs of images based on the near-duplicate pairs of feature vectors;
filtering the set of images by removing one or more images from the set of images, wherein the removed images belong to the near-duplicate pairs of images; and
adding images from the filtered set of images to a training dataset for training the machine learning model.

17. The computer system of claim 16, wherein the instructions further cause the one or more computer processors to perform steps comprising:
training the machine learning model using the training dataset, the training comprising updating parameters of the machine learning model.

18. The computer system of claim 16, wherein the instructions further cause the one or more computer processors to perform steps comprising:
using images from the filtered set of images for validating the machine learning model.

19. The computer system of claim 16, wherein finding near-duplicate pairs of feature vectors based on the cost matrix comprises solving a linear assignment problem based on the cost matrix.

20. The computer system of claim 19, wherein solving the linear assignment problem based on the cost matrix is performed using a Hungarian matching process.

* * * * *